(12) United States Patent
Mitchell et al.

(10) Patent No.: US 7,073,634 B2
(45) Date of Patent: Jul. 11, 2006

(54) AUTOMATED WAREHOUSE ROW CART AND LIFT

(75) Inventors: Pat R. Mitchell, Stockton, CA (US); William R. Tipton, Acampo, CA (US)

(73) Assignee: California Natural Products, Lathrop, CA (US)

( * ) Notice: Subject to any disclaimer, the term of this patent is extended or adjusted under 35 U.S.C. 154(b) by 17 days.

(21) Appl. No.: 10/724,339

(22) Filed: Nov. 28, 2003

(65) Prior Publication Data
US 2005/0118003 A1 Jun. 2, 2005

(51) Int. Cl.
*B66B 20/00* (2006.01)

(52) U.S. Cl. ...................................... 187/414
(58) Field of Classification Search ............... 414/471, 414/284, 433, 784, 754, 752; 187/224, 267, 187/268, 414; 74/107, 567, 527, 569; 269/229
See application file for complete search history.

(56) References Cited

U.S. PATENT DOCUMENTS

| | | | | |
|---|---|---|---|---|
| 3,722,706 A | * | 3/1973 | Blonsky | 212/259 |
| 3,973,685 A | * | 8/1976 | Loomer | 414/273 |
| 3,978,873 A | * | 9/1976 | Gross | 453/35 |
| 4,112,472 A | * | 9/1978 | Hauke et al. | 360/84 |
| 4,238,055 A | * | 12/1980 | Staar | 222/162 |
| 4,289,466 A | * | 9/1981 | Weeper | 425/112 |
| 5,388,955 A | * | 2/1995 | Schroder | 414/279 |
| 5,867,338 A | * | 2/1999 | Ohira et al. | 720/627 |
| 6,097,272 A | * | 8/2000 | Grover et al. | 335/207 |
| 6,176,258 B1 | * | 1/2001 | Bernardi | 137/554 |
| 6,652,213 B1 | | 11/2003 | Mitchell | |
| 6,834,517 B1 | * | 12/2004 | Sheehy, Jr. | 66/132 T |

* cited by examiner

*Primary Examiner*—Eileen D. Lillis
*Assistant Examiner*—Charles A. Fox
(74) *Attorney, Agent, or Firm*—Robert Charles Hill

(57) ABSTRACT

An automated warehouse system row cart includes a lifter that uses cams to raise and lower pallets. Three symmetrical cam lobes are cut into a hollow cylinder. Three matching cam lifters ride these lobes and are attached to an elevator plate. A stepper motor running in one direction is used to raise and lower the elevator plate by virtue of the action between the cam lobes and lifters.

4 Claims, 6 Drawing Sheets

AUTOMATED WAREHOUSE ROW CART AND LIFT

BACKGROUND OF THE INVENTION

1. Field of the Invention

The present invention relates to automated storage and retrieval systems (AS/RS), and more particularly to material handling systems for storing and accessing palletized material in large multi-story automated warehouse buildings.

2. Description of Related Art

Automated warehouses and automated storage and retrieval systems (AS/RS) can reduce costs, pilferage, and damage because far fewer workers are needed for otherwise similar operations.

U.S. Pat. No. 6,652,213, which is incorporated herein by reference, describes an automated storage module system. Elevators operate within exterior fixed elevator shafts amongst many floors in multi-story automated warehouse. A number of corresponding aisleways at each level of the warehouse each connect to the elevators on every level. A number of rows on each level are orthogonal to each aisleway, and allow palleted material on uniform-sized pallets to be warehoused. One aisle cart per aisleway provides a piggyback parking space on its top that can be aligned to each of the number of rows on its respective level. A row cart that is able to run along any of the number of rows on its respective level and, when aligned, it can park on the piggyback parking space on the top of any intersecting aisle cart. Such provides for independent operation by being umbilical or battery powered, and it can shuttle the palleted material along a row and aboard the intersecting aisle cart. A computer system provides for movement control of the elevators, aisle carts, and row carts with the aid of strategically placed position sensors for the carts and identity tags for the palleted material.

The row carts need to be able to lift up the pallets loaded on their backs to match the heights of shelves and elevator floors they visit. Typically, a lift of 3–5 inches is enough. Prior art lifting devices on row carts have proven to be complex, bulky, and unreliable in being able to lift straight. Combinations of lift bars and hydraulics have all been tried, often with poor results in heavy use, and even product damage. One such row cart used four jacking screws that demanded a lot of maintenance and wore rapidly.

SUMMARY OF THE INVENTION

An object of the present invention is to provide an automated storage and retrieval system that is economical to install and operate.

Another object of the present invention is to provide a simple lifting device that can keep pallets level as they are risen.

A further object of the present invention is to provide a lifting device in a warehouse automation system that is simple and requires little maintenance.

Briefly, an automated warehouse system row cart embodiment of the present invention includes a lifter that uses cams to raise and lower pallets. At least three symmetrical cam lobes are cut into a hollow cylinder. Matching cam lifters ride these lobes and are attached to an elevator plate. A stepper motor running in one direction is used to raise and lower the elevator plate by virtue of the action between the cam lobes and lifters.

An advantage of the present invention is that a system is provided that efficient, robust, and requires little maintenance.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
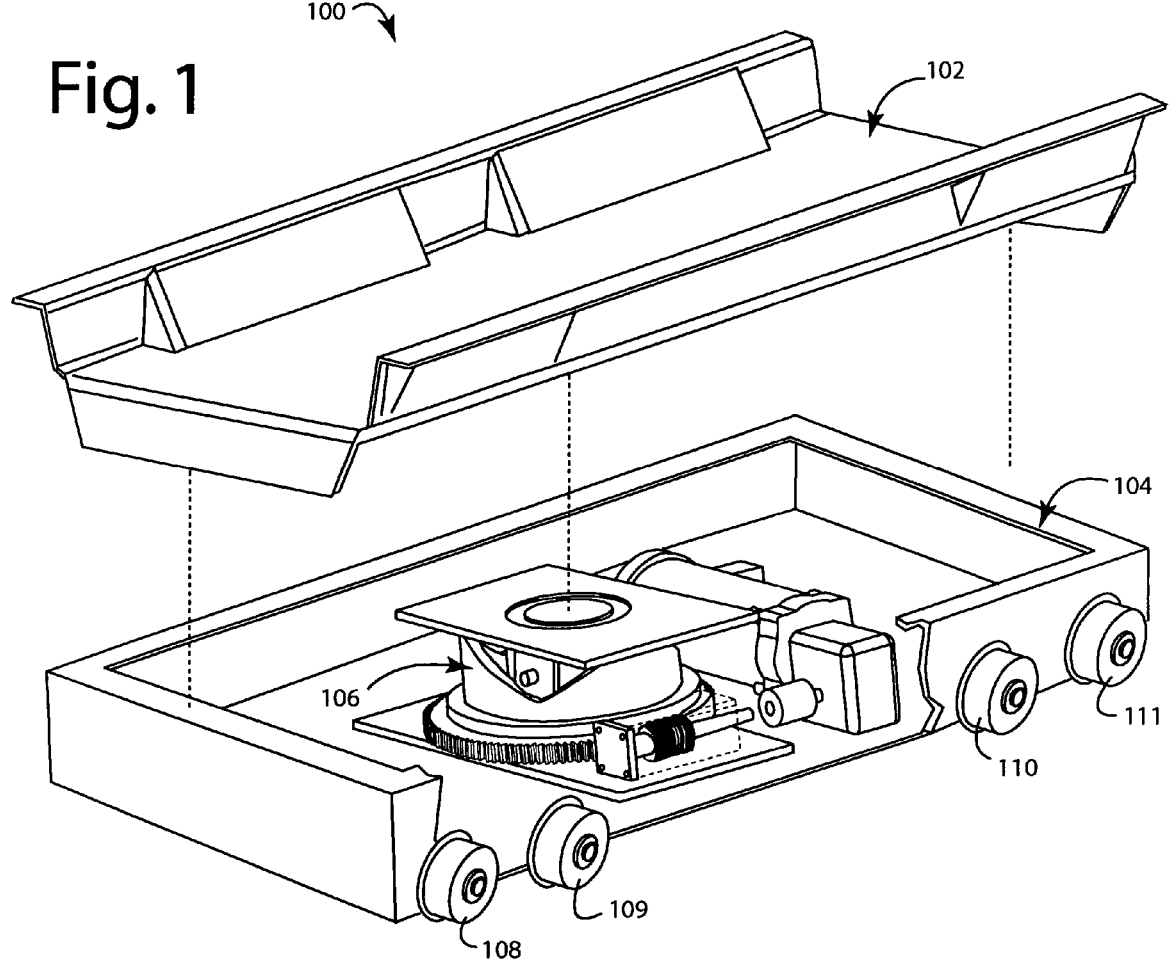
FIG. 1 is a perspective, exploded assembly view diagram of a warehouse system row cart embodiment of the present invention.

FIG. 1 illustrates a warehouse system row cart embodiment of the present invention, referred to herein by the reference numeral 100. The row cart 100 comprises a top tray 102 mounted to a rail car 104. A lifter 106 is mounted inside the rail car 104 and can smoothly lift the top tray 102 as much as a few inches higher. A set of rail wheels 108–111 is shown and a similar set is out of view on the opposite side.

Figure 2:
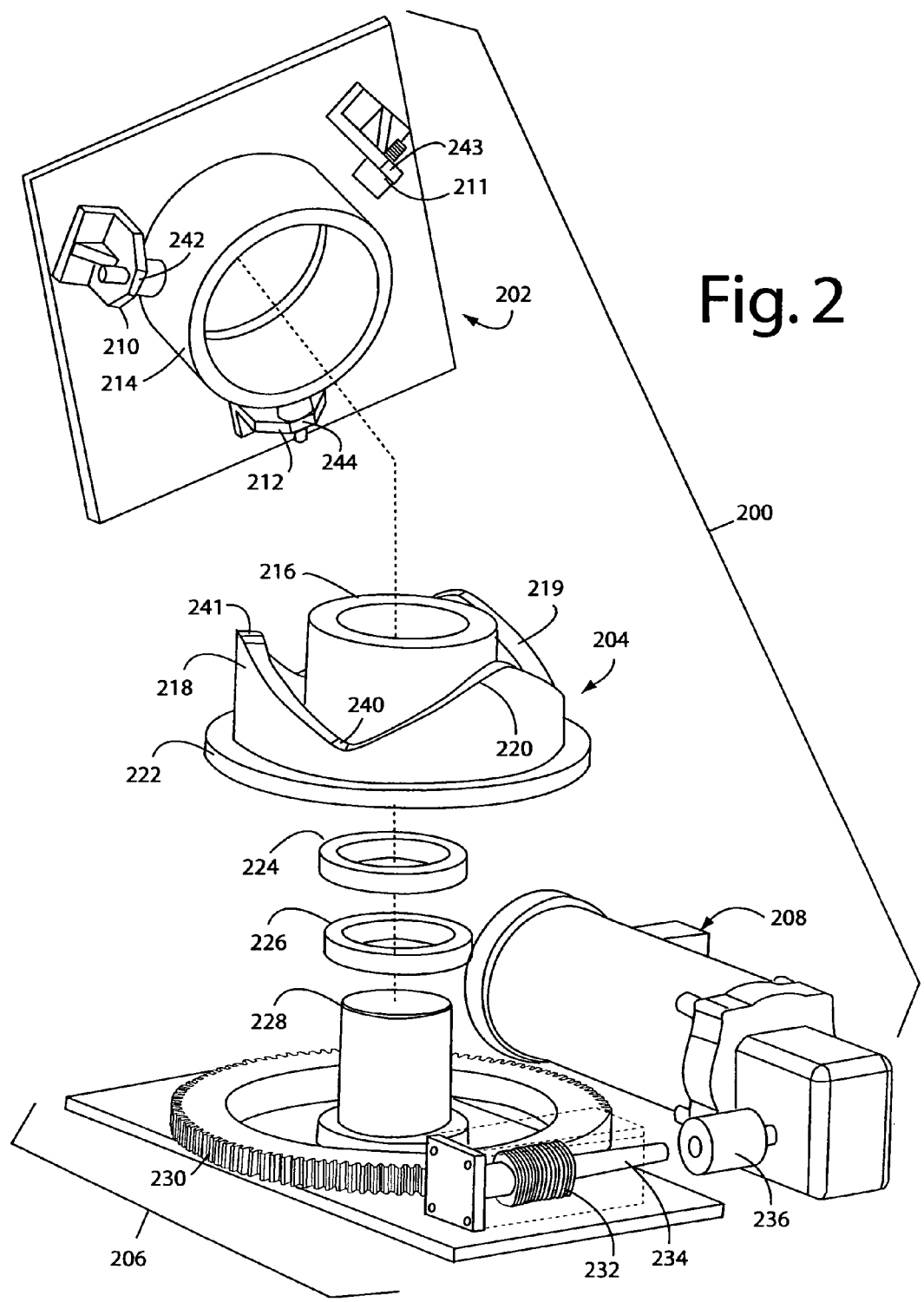
FIG. 2 is a perspective, exploded assembly view diagram of a lifter embodiment of the present invention that can be used in the warehouse system row cart of FIG. 1.

FIG. 2 illustrates a lifter embodiment of the present invention, referred to herein by the reference numeral 200. The lifter 200 comprises an elevator plate 202 that rides on a triple-lobe cam 204. Such are operated by a transmission 206 driven by a stepping motor 208. Four lobe configurations are possible, but the lobe ramping angles become so high that a great deal of torque is required to be delivered by motor 208. The torque that is required with three lobes is made practical by the high gear ratios of ring and worm gear transmissions.

The elevator plate 202 includes three fixed cam lifters 210–212 that surround an outer collar 214. This mates with an inner collar 216 on the triple-lobe cam 204. Three identical cam lobes 218–220 match the distribution of the fixed cam lifters 210–212. The triple-lobe cam 204 is intended to rotate relative to the elevator plate 202, and this rotation will cause elevator plate 202 to smoothly rise and fall. The three fixed cam lifters 210–212 provide a three-point support to maintain the parallel plane alignment of the top surface of elevator plate 202 with a base 222.

A pair of bearings 224 and 226 allow the triple-lobe cam 204 to turn with very little wobble on a shaft 228. The base 222 is attached to a ring gear 230 turned by a worm gear 232, a driveshaft 234, and a stepping motor coupler 236. The symmetrical shaping of cam lobes 218–220 allows the lifter 200 to operate without requiring stepping motor reversals for up and down elevator actions. The stepping motor 208 can be operated in one direction and simply stopped when the elevator plate 202 is at a desired height. Sensors to detect the position of elevator plate 202 would normally be included in the stepping motor control system for stepping motor 208. Keys or slots are used to prevent the rotation of elevator plate 202 as stepping motor 208 is operated.

The multiple-lobe cam and cam lifters can mutually provide flat spots 240–244 on which to rest at minimum and maximum heights of elevation of the elevator plate.

In an alternative embodiment, the elevator plate 202 is the mirror image of, and fits over, triple-lobe cam 204. The lobes of each set ride over the other matching set.

Figure 3:
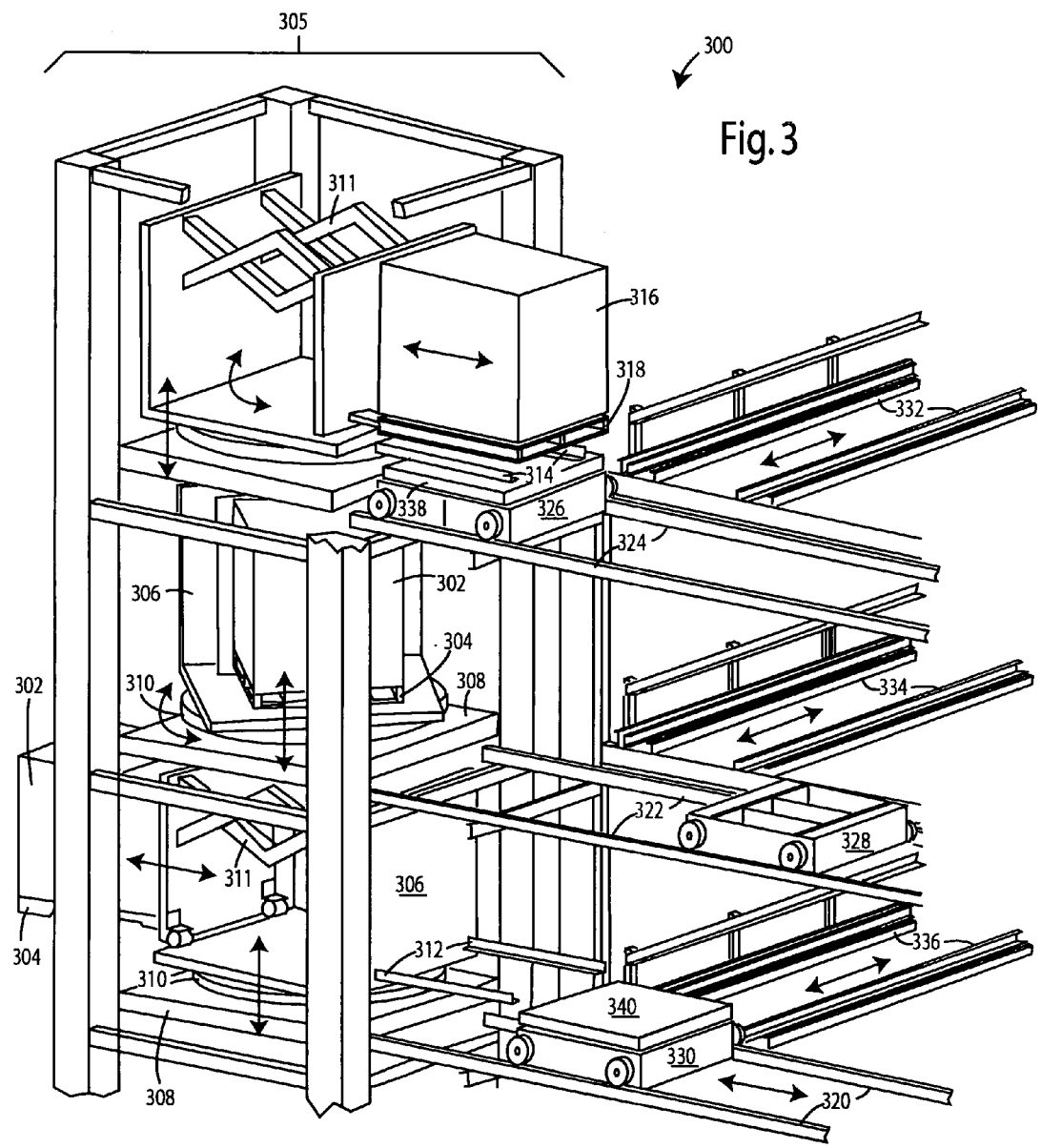
FIG. 3 is a perspective view of a warehouse system embodiment of the present invention, and uses the row cart of FIG. 1.

FIG. 3 partially illustrates a warehouse system embodiment of the present invention, referred to herein by the reference numeral 300. Such includes the row carts 100 (FIG. 1) and lifters 00 (FIG. 2). The warehouse system 300 is preferably installed in a high profile warehouse building with at least one freight elevator. A product 302 on a standard pallet 304 is lifted and retracted into a loading elevator shaft 305 by a rotating forklift 306. A uniform pallet size is desired for a specific system. For example, a "standard" pallet in a grocery application would be a Grocery Manufacturers Association (GMA) 40"×48" pallet with four way entry. An elevator car 308 supports a turntable 310 and the rotating forklift 306 which is mounted inside. The rotating forklift 306 can extend its forks to reach out and bring in or drop off product loaded on a standard pallet. A scissors mechanism 311 allows an adequate reach to bring pallets in and out of the elevator car 308.

FIG. 3 shows three each of such rotating forklifts 306, elevator cars 308, and turntables 310, but in actual use only one such set would be present. These three sets are shown in FIG. 3 to illustrate the different phases of use that occur over time. The bottom set demonstrates incoming material being received. The middle set demonstrates the material being spun around and reoriented to face the warehouse system interior. The top set demonstrates the unloading of the elevator car and staging for transfer to the aisle cart.

Once the pallet 304 and product 302 are inside the loading elevator shaft 305, the rotating forklift 306 is spun around on the turntable 310 to face the interior levels of the warehouse system. When the pallet 304 and product 302 are transported and arrive at a particular level, the rotating forklift 306 extends out and deposits the product and pallet on a temporary support. An empty temporary pallet support 312 is shown on the bottom level as two opposing L-angle steel sections. A loaded temporary pallet support 314 is shown at the top level, also as two opposing L-angle steel sections, just below a product 316 and its pallet 318. Such pallet supports 312 and 314 allow the elevator to drop off its incoming load, and then go on to another task. The corresponding outgoing pallet supports (FIG. 2) allow the aisle carts to drop off their outgoing loads, and then return to a designated location for another task. It should be understood that the previous two functions can be accomplished with one universal elevator.

A set of three aisle railways 320, 322, and 324 are shown for the three levels visible in FIG. 3. These railways run between the loading elevator shaft 305 to a corresponding unloading elevator shaft (FIG. 3) on the same level. Where only a single or universal elevator is used, then these railways run from the elevator to the far end of the system. Each level has one aisle cart 326, 328, and 330 that shuttles along the aisle railways 320, 322, and 324 between the temporary pallet supports 312 and 314 for the elevator. Perpendicular to each aisleway are several parallel row rails, e.g., an upper-level row rail 332, a middle-level row rail 334, and a lower-level row rail 336. Each level will typically have more than one row and row rail, FIG. 3 shows only one set for each level so the illustration does not become cluttered and hard to read. The aisle carts 326, 328, and 330 carry battery powered piggyback or row carts that run back and forth along a row. A battery powered row cart 338, similar to row cart 100 (FIG. 1), is shown docked atop its aisle cart 326. An empty row cart 340 is shown docked atop its aisle cart 330.

In operation, each aisle cart 326, 328, and 330 is positioned in front of a designated row along the aisleway, and the row cart (e.g., 338) delivers, deposits, and retrieves product on pallets along the rows. Storage supports are provided along both sides of each row for storing the product and pallet at a designated position.

The movement of the aisle carts, row carts, elevators, turntables, extending forklifts, etc., is preferably computer controlled. This allows applications software to be in charge of all the material handling. This application software works in conjunction with inventory control software, such as AIM software available from TRW.

Figure 4:
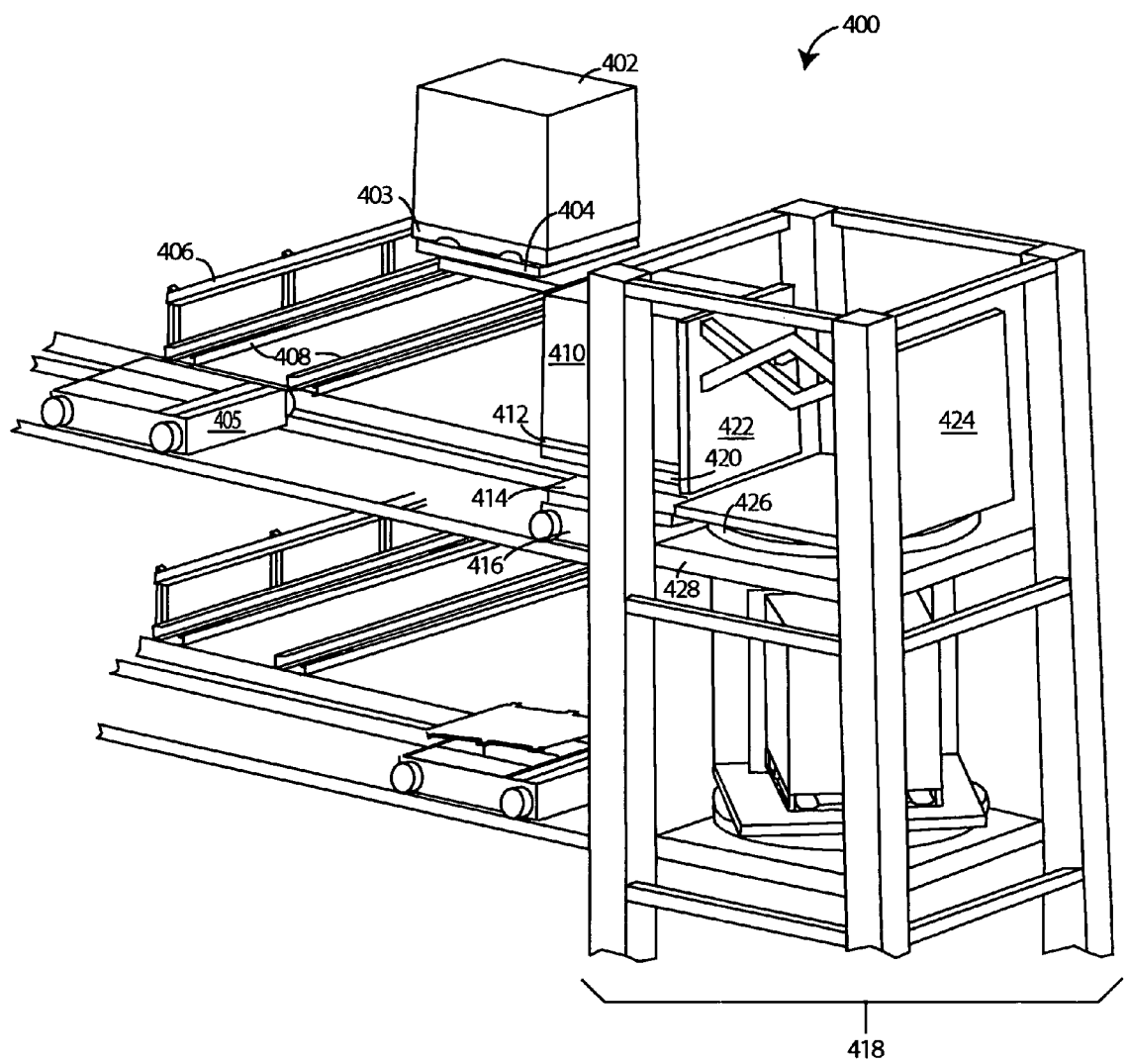
FIG. 4 is a perspective view of the internal material-transfer and storage portion of the warehouse system of FIG. 3.

FIG. 4 illustrates another portion of the warehouse system 400, especially that part concerned with transferring material on pallets between aisles and rows on multiple levels. The warehouse system 400 allows a product 402 on a standard pallet 403 to be carried along a row by a row cart 404 after it undocks from its position on top of an aisle cart 405. Row cart 404 is similar to row cart 100 (FIG. 1) and uses lifter 200 (FIG. 2).

In one embodiment of the present invention, a pair of pallet support rails 406 above and outside of a pair of row rails 408 allows the row cart 404 to drop off or pick up the product 402 and pallet 403. When the row is empty, the first unit of product 402 and pallet 403 is taken and deposited at the back position of the row. The next unit of product 402 and pallet 403 is deposited at the next position, and so on until the row is full of the same product. Each row can have from one to ten or more positions. The pair of pallet support rails 406 are parallel and spaced such that they will support the pallet 403 between them. The row cart rolls off the aisle cart, proceeds to the proper position on the row and stops. The lifting device then retracts so that the pallet is now supported on the support rails 406. When retrieving the product 402 and pallet 403, the row cart 404 positions itself under the pallet and load, and then lifts the product 402 and pallet 403 up off the pallet support rails 406 before returning to its docking position on the aisle cart 405, which then moves toward an elevator and, for description purposes, becomes aisle cart 416.

In FIG. 4, a product 410 on a pallet 412 is being carried by a row cart 414 docked on top of an aisle cart 416. Such is brought to an unloading elevator 418 and deposited on a temporary support 420 by retraction of the row cart 414. The aisle cart 416 can then proceed to another assignment with the row cart 414 on top thereof. The product 410 and pallet 412 are positioned on the temporary support for an extending forklift 422 to reach out and retrieve product and pallet into the unloading elevator 418. The extending forklift 422 is attached to a rotating base 424, which is in turn supported on a turntable 426 and elevator car 428.

Figure 5:
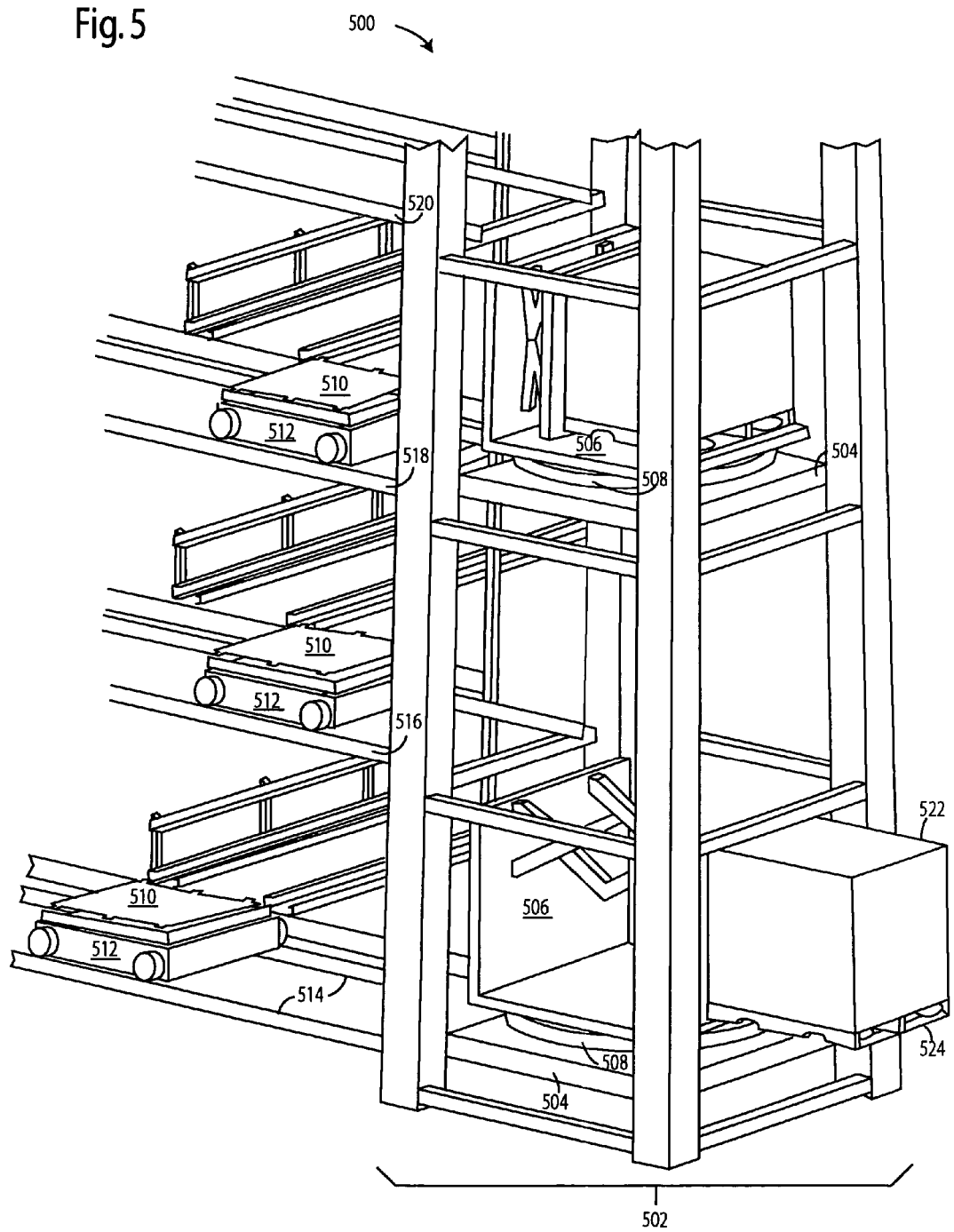
FIG. 5 is a perspective view of the unloading elevator and material-output portion of the warehouse system of FIG. 3.

FIG. 5 illustrates another portion of the warehouse system 500, especially that part concerned with unloading material on pallets out of the system. An unloading elevator 502 includes an elevator car 504 that transports product and pallet to the various levels. A rotating forklift 506 is carried on a turntable 508 on the elevator car 504. A row cart 510 on top of an aisle cart 512 rides on aisle rails 514, 516, 518, or 520, to deliver product on pallets to the unloading elevator 502. Row cart 510 is similar to row cart 100 (FIG. 1) and uses lifter 200 (FIG. 2). Once the product on pallets is retrieved onto the elevator car 504 by the rotating forklift 506, the turntable is spun around 90° to 180° so that loaded pallets can be presented to the dock staging system for shipment to any desired destination.

Figure 6:
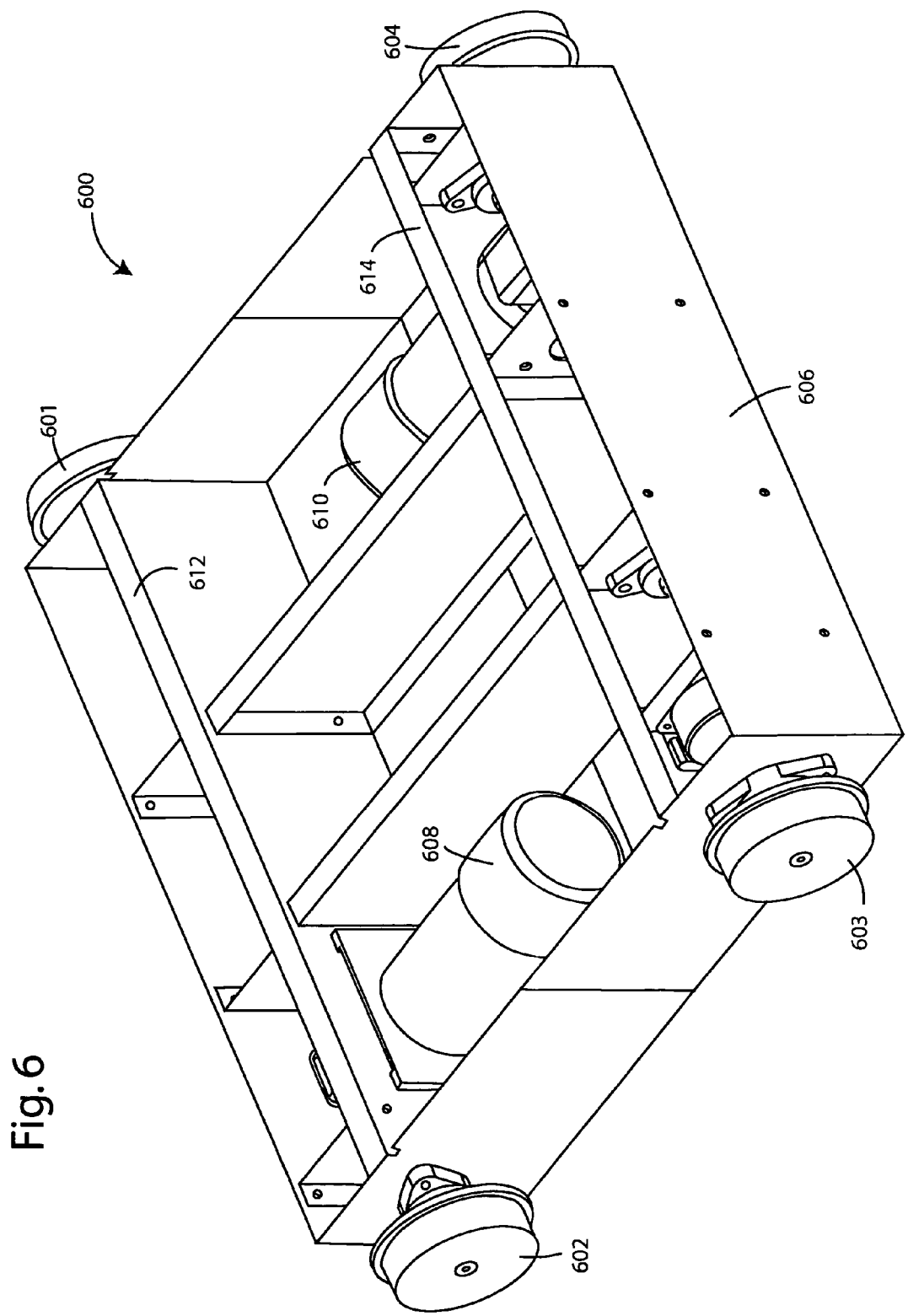
FIG. 6 is a perspective view of a rail trolley or aisle cart used in the warehouse system of FIG. 3.

FIG. 6 represents an aisle cart 600 similar to those shown in FIGS. 1–3. The aisle cart 600 includes a set of four wheels 601–604. These are attached with axles to a lower chassis 606 and ride on the aisle rails, e.g., 320, 322, and 324 (FIG. 3). A pair of electric stepping motor and gear units 608 and 610 are mechanically connected to the four wheels 601–404 to drive the unit back and forth along the aisleways. A pair of rail sections 612 and 614 allow a row cart to roll on and off the top to one side or the other, albeit only when properly aligned with a row.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A lifter, comprising:
   a triple-lobe cam with a base and an inner collar;
   an elevator plate that includes three fixed cam lifters to correspondingly ride on the triple-lobe cam, and an outer collar which mates with said inner collar;
   a transmission with a ring gear attached to said base, and a worm gear to receive unidirectional drive from a motor to provide changes in the vertical position of the elevator plate.

2. The lifter of claim 1, further comprising:
   a shaft included in the transmission with a pair of bearings slipped inside said inner collar to stabilize and to allow the triple-lobe cam to turn.

3. The lifter of claim 1, further comprising:
   a series of flat spots disposed on matching surfaces of the triple-lobe cam and the fixed cam lifters for minimum and maximum heights of the elevator plate.

4. The lifer of claim 1 wherein the outer collar of the elevator plate slips over the inner collar of the triple-lobe cam.

* * * * *